United States Patent [19]

Monaldi et al.

[11] Patent Number: 4,610,715

[45] Date of Patent: Sep. 9, 1986

[54] PROCESS FOR PREPARING FERTILIZERS RELEASING NITROGEN SLOWLY

[75] Inventors: Remo Monaldi, Mestre; Raffaello Fortibuoni, Porto Marghera, both of Italy

[73] Assignee: Montedison S.p.A., Milan, Italy

[21] Appl. No.: 497,042

[22] Filed: May 23, 1983

[30] Foreign Application Priority Data

May 27, 1982 [IT] Italy ................ 21508 A/82

[51] Int. Cl.$^4$ ................................. C05C 9/00
[52] U.S. Cl. ............................. 71/28; 71/29; 71/30
[58] Field of Search .............. 71/28, 29, 30, 40, 42, 71/43; 564/59

[56] References Cited

U.S. PATENT DOCUMENTS

| | | | |
|---|---|---|---|
| 2,845,401 | 7/1958 | Gilliam | 260/71 |
| 3,129,091 | 4/1964 | Buter | 71/28 |
| 3,198,761 | 8/1965 | O'Donnell | 71/28 |
| 3,677,736 | 7/1972 | Formaini | 71/28 |
| 4,057,392 | 11/1977 | O'Donnell | 71/28 |
| 4,089,899 | 5/1978 | Greidinger et al. | 260/533 R |
| 4,173,582 | 11/1979 | Greidinger et al. | 564/59 |

*Primary Examiner*—Ferris H. Lander
*Attorney, Agent, or Firm*—Stevens, Davis, Miller & Mosher

[57] ABSTRACT

A process for preparing a fertilizer, releasing nitrogen slowly, containing ureaform and at least one other fertilizing material, wherein urea and formaldehyde are reacted in aqueous phase at temperatures ranging from 30° to 60° C., and at the following molar ratios: urea/formaldehyde from 1.2 to 2; water/urea from 0.7 to 10, the reaction being carried out at a pH ranging from 2 to 4, by addition of an acid substance;

the so-obtained ureaform aqueous suspension is mixed with at least one other fertilizing material and with a portion of the (recycled) final product in an amount such as to give to the mixture a pH ranging from 4.0 to 5.5; the mixture is granulated at temperatures ranging from 50° to 85° C.;

before the granulation ends, the pH of the product is increased to values ranging from 5.8 to 7 by the addition of an alkaline substance;

the product is dried, and a portion thereof recycled as indicated.

4 Claims, No Drawings

PROCESS FOR PREPARING FERTILIZERS RELEASING NITROGEN SLOWLY

The present invention relates to a process for preparing fertilizers releasing nitrogen slowly.

More particularly, it relates to the preparation of fertilizers containing ureaform and at least one other fertilizing material.

It is known that urea reacts with formaldehyde in an aqueous medium to form insoluble condensation products consisting of polymethylenepolyureas having various molecular weights, which are commercially known as "ureaform". After application to the soil, the ureaform gradually depolymerizes by forming soluble nitrogenous compounds and therefore acts as a fertilizing material, releasing nitrogen slowly.

The agronomical value of the ureaform is expressed by its activity index, which is indicative of the rate of solubilization of the water-insoluble nitrogen. This index and the manner of determining it are described in "The Official Methods of Analysis of the Association of Official Analytical Chemists", edited by William Horwitz, 30th Edition, 1980, page 17.

The optimum value of the activity index ranges from 40 to 60.

NPK complex fertilizers containing ureaform have been prepared heretofore by three different methods:

1. In a first method, the solid ureaform is prepared in powdered or granular form and is added to other nitrogenous, phosphatic and potassic materials.
2. In a second method, the ureaform is prepared in an aqueous suspension and the suspension is added to other nitrogenous, phosphatic and potassic materials.
3. In a third method, the ureaform is prepared "in situ" by reacting urea and formaldehyde in the presence of other nitrogenous, phosphatic and potassic materials.

The first process is expensive, because it needs a filtration step for the ureaform produced in the aqueous phase, the drying and the optional granulation thereof; then a subsequent working stage is necessary for the addition of the ureaform to the other fertilizing materials.

The second process presents the drawback of needing a very careful control of the reaction conditions, to obtain a suspension with a polymerization degree that will remain stable for a long period of time and therefore avoiding excessive polycondensation, which, besides reducing the agronomical value of the ureaform, could jeopardize the ease of treatment thereof in the subsequent working stage, which, in this case too, is necessary for the addition of the ureaform to the other fertilizing materials.

The third process presents the drawback of a lower reaction yield between urea and formaldehyde owing to the small amount of water in the system, which prevents the complete dissolution of the urea; furthermore, this process needs a strict control of the product temperature during the granulation stage.

An object of the present invention is to provide a process for preparing fertilizers containing ureaform and at least one other fertilizing material, that allows one to obtain a product with an activity index from 40 to 60 that remains constant for a long period of time.

Another object is to provide a process of economic management, that allows one to operate under less critical conditions and therefore to have a higher working flexibility.

These and still further objects have been achieved by the present invention, which provides a process for preparing a fertilizer releasing nitrogen slowly containing ureaform and at least one other fertilizing material, characterized in that:

1. Urea and formaldehyde are reacted in aqueous phase at temperatures ranging from 30° to 60° C. and complying with the following molar ratios: urea/formaldehyde from 1.2 to 2; water/urea from 0.7 to 10; the reaction being carried out at a pH ranging from 2 to 4 by the addition of an acid substance.
2. The so-obtained ureaform aqueous suspension is mixed with at least one other fertilizing material and a portion of recycled final product, which portion must be such as to assure to the mixture a pH ranging from 4 to 5.5; the mixture is granulated at temperatures ranging from 50° to 85° C.
3. Before the granulation ends, the product pH is increased to values ranging from 5.8 to 7 by the addition of an alkaline substance.
4. The product is dried and a portion thereof is recycled to the second step.

An essential characteristic of this process consists in that the polycondensation of urea with formaldehyde takes place in two steps: it starts in liquid phase at pH 2–4 in the first step and continues in solid phase at pH 4–5.5 in the second step in the presence of the other fertilizing material or of the other fertilizing materials and of a portion of recycled final product, while one proceeds to the granulation. Subsequently, the polycondensation is stopped by increasing the pH to 5.8–7, before the granulation ends.

In the polycondensation stage in liquid phase, the pH of the urea and formaldehyde solution is kept at 2–4 by addition of an acid substance. Preferably, this substance is chosen in such a way that its neutralization, which is completed in the third step, gives rise to a fertilizing material; thus, for example, use may be made of diluted (for example, 10–20% by weight) phosphoric or sulphuric acid, which, in the third step, is converted into ammonium phosphate or ammonium sulphate, if the alkaline substance of the third step is ammonia.

The urea and the formaldehyde may be fed to the first step in any form and, more particularly, the urea may be in solid form or already in aqueous solution, while the formaldehyde may be in gaseous form or in aqueous solution. A commercial solution of urea and formaldehyde may be used as well, such as, for example, Formurea 80 produced by Montedison S.p.A. that contains about 57% of formaldehyde, about 23% of urea, and about 20% of water; in this case, urea and water are also employed in order to obtain the above-indicated molar ratios urea/formaldehyde and water/urea.

The reaction time in liquid phase generally ranges from 0.5 to 3 hours and preferably from 1.5 to 2.5 hours.

At the end of the reaction, one obtains a slurry of condensed ureaform in uniform suspension in the aqueous medium.

The molar ratio urea/formaldehyde in the first step preferably ranges from 1.4 to 1.8.

The molar ratio water/urea in the first step preferably ranges from 1.0 to 2.0.

The pH in the first step preferably ranges from 3.0 to 3.5.

The temperature in the first step preferably ranges from 40° to 55° C.

The various substances entering the first stage may be fed directly into the condensation reactor: this procedure is particularly suitable when one has at his disposal urea in solution. If one has no urea in solution at his disposal, it is preferred to feed the water, the formaldehyde, and the urea into a mixing reactor, thereby forming a homogeneous solution, which, together with the acid substance, is fed into the condensation reactor. In this case, the solution temperature in the mixing reactor is regulated at temperatures generally between 20° and 40° C. and preferably between 20° and 30° C.: by mean of such regulation and by exploiting the exothermicity of the condensation reaction, the temperature in the condensation reactor can be easily kept at the chosen value.

The ureaform suspension, a portion of the recycled final product, and at least one other fertilizing material is fed into the second stage, where the polycondensation in solid phase and the granulation of the fertilizer take place.

By appropriately choosing the other fertilizing material or the other fertilizing materials, final products can be obtained, based only on nitrogen, on nitrogen and phosphorus, on nitrogen and potassium, or on nitrogen, phosphorus and potassium. Among the fertilizing materials which can be added, there are, for example, urea, ammonium sulphate, ammonium nitrate, superphosphate, supertriple, phosphoric acid, ammonium phosphates having different ammoniazation degrees in the solid state or in aqueous suspension, potassium chloride and potassium sulphate.

Other materials may be also added, for example, diluents, magnesium salts (for example, more or less hydrated magnesium sulphate), or salts which supply trace elements, such as, for example, iron, zinc, manganese and boron.

The pH in the second step is kept at values ranging from 4.0 to 5.5. Taking into account that the pH of the ureaform aqueous suspension (2.0–4.0) is lower than such values, the pH in the second step is increased by recycling a portion of the final product which has a pH between 5.8 and 7. The recycle of the final product may also be used for compensating for the acidity of acid ingredients, such as, for example, the phosphoric acid or the superphosphate. In these cases, the pH is kept within the range of 4.0–5.5 by dosing both the recycle and the quantity of acid ingredients. The best results are usually obtained by keeping the pH within the range of 4.5–5.5.

The recycle ratio is generally between 3:1 and 7:1, and more commonly between 4:1 and 6:1.

The fertilizer granulation takes place contemporaneously with the carrying on of the polycondensation reaction. The operation time is regulated as a function of the granulation needs. One works at temperatures between 50° and 85° C.; the best results are usually obtained at temperatures between 70° and 80° C. When necessary, one heats, for example, by means of steam.

Before the granulation ends, the product pH is increased to values between 5.8 and 7 by the addition of an alkaline substance, such as, for example, ammonia or calcium hydroxide. Preferably, use is made of gaseous ammonia. The pH increase stabilizes the polymerization degree of the ureaform since, at pH values between 5.8 and 7, the polycondensation reaction stops. Preferably, the pH is increased to values between 6.0 and 6.5.

The stage of granulation and polycondensation in solid phase and that of stabilization of the product pH can be carried out in a single apparatus, in the terminal part of which a device is set up for the feeding of the alkaline substance. This device can be set up, for example, between the seventh-tenth and the ninth-tenth of the apparatus length.

The possibility of using a single apparatus to carry out these various operations is an essential advantage of the present invention. However, the stage of granulation and polycondensation in solid phase and that of stabilization of the product pH may also be carried out in two distinct apparatuses. The single apparatus or the two apparatuses may consist, for example, of granulating drums or of granulating screws. The granulation continues during and after the addition of the alkaline substance, until the product comes out of the apparatus.

The product brought to pH 5.8–7.0 is successively dried in a drier of conventional type, until a low residual moisture content, for example, of 1–2%, is reached. The drying is generally carried out at temperatures between 85° and 100° C. and more commonly at temperatures between 90° and 95° C. The dried product is then subjected to a granulometric classification; the fractions under and over the desired measure (this last is ground), together with a part of the product having the desired measure, form the recycle that is sent back to the stage of granulation and completion of the polycondensation. By the "desired measure" is meant that the granular finished product is so composed that is contains commonly 3% by weight above 1 mm. in size, 65% above 2 mm., 30% above 3 mm., 2% above 4 mm., and 0% above 5 mm. The product is preferably cooled to below 45° C. before being stored.

The principal advantages of the present invention may be summarized as follows:

one obtains a fertilizer with high and constant chemical and physical characteristics, having an activity index in nitrogen ranging from 40 to 60, and constant or stable over a long time;

the process is economical and it is possible to operate under less critical conditions, in comparison with those of the known technique; therefore, it is possible to operate with a higher working flexibility;

the process is endowed with a wide formulation elasticity: it is possible to obtain a large number of nitrogenous, nitrogenous and phosphatic, nitrogenous and potassic and nitrogenous, phosphatic and potassic fertilizers having different ratios among the fertilizing elements and a slow-release nitrogen content up to 50–60% of the total nitrogen;

it is possible to carry out the whole production cycle by utilizing existing plants for production of non-slow-release fertilizers, by making in them only small changes which are not substantial from the economical point of view;

the operations of granulation-polycondensation in solid phase and of stabilization of the pH of the product may be carried out in a single apparatus.

The following examples still better illustrate the present invention. The percent values refer to percentages by weight, if not otherwise indicated.

EXAMPLE 1

A 15.7.7S fertilizer free from chlorine was produced by operating continuously as follows (the amounts refer to a metric ton of final product):

145 kg. of a commercial solution of Formurea 80 (57% of formaldehyde, 23% of urea, 20% of water), 253 kg. of urea at 46% of N, and 80 kg. of water were uniformly mixed and brought to the temperature of 20° C. in an open reactor under stirring, thereby obtaining a solution having a molar ratio urea/formaldehyde of 1.73:1 and a molar ratio water/urea of 1.27:1 and with a pH of 6.0.

The solution was transferred through an overflow into a second reactor under stirring, where 6.2 kg. of an aqueous solution of $H_3PO_4$ at 4% of $P_2O_5$ were added, in order to obtain a pH of 3.5 in the reacting mixture.

In this second reactor the temperature became stable at 50° C. because of the heat developed by the condensation reaction between urea and formaldehyde. The average residence time of the solution in the reactor was 2 hours. The so-produced ureaform suspension, equivalent to 462 kg., was directly fed, always continuously and without stopping the working cycle, into a drum granulator, where 407 kg. of 0.18.0 superphosphate, 56 kg. of ammonium sulphate, 147 kg. of potassium sulphate at 50% of $K_2O$, 80 kg. of an inert material (sand), together with 5000 kg. of recycle product (having a moisture content of 1.5%) coming from a preceding processing were added.

The product pH during the granulation was 5.5 and the temperature 72° C.

The product was then ammoniated in the terminal part of the granulator by the addition of 18 kg. of gaseous ammonia. The pH value at the granulator outlet was 6.0. The fertilizer coming out of the granulator, having a moisture content of 5.9%, was dried to 1.5% of moisture in a drier at a temperature of 95° C. and successively screened; the part between 1 and 4 mm. forms the final product, while the appropriately ground coarser and finer parts form the recycle, which is mixed or integrated with a portion of the final product.

The so-prepared fertilizer, upon analysis, gave the following results:

| | |
|---|---|
| ammoniacal nitrogen | 2.55% |
| ureic nitrogen | 6.45% |
| water-insoluble nitrogen | 6.20% |
| total nitrogen | 15.20% |
| water-and-ammonium-citrate-soluble $P_2O_5$ | 7.20% |
| $K_2O$ | 7.20% |
| moisture | 1.50% |
| activity index | 46 |

The caking, hardness and friability characteristics of the granules were comparable to those of a conventional high-quality NPK fertilizer.

EXAMPLE 2

A 14.6.18+2 MgO fertilizer, free from chlorine, was produced by operating continuously as follows (the specified amounts refer to a metric ton of final product):

145 kg. of a commercial solution of Formurea 80, 253 kg. of urea at 46% of N, and 100 kg. of water were uniformly mixed and brought to the temperature of 20° C. in an open reactor under stirring, thereby obtaining a solution having a molar ratio urea/formaldehyde of 1.73:1 and a molar ratio water/urea of 1.50:1.0, and with a pH of 6.0–6.1.

The solution was transferred through an overflow into a second open reactor under stirring, where 8.0 kg. of an aqueous solution of $H_3PO_4$ at 4% of $P_2O_5$ were added, the addition being regulated in order to obtain a pH of 3.2 in the reacting mixture.

In this second reactor the temperature became stable at 52° C. because of the heat developed by the condensation reaction between urea and formaldehyde. The average residence time of the solution in the reactor was 1 hour and 50 minutes.

The so-produced ureaform suspension, equivalent to 483 kg., was directly fed, always continuously and without stopping the working cycle, into a drum granulator, where 97.2 kg. of an aqueous solution of phosphoric acid at 36% of $P_2O_5$, 161 kg. of 0.18.0 superphosphate, 10 kg. of urea at 46% of N, 371 kg. of potassium sulphate at 50% of $K_2O$, and 65 kg. of Kieserite at 27% of MgO, together with 4500 kg. of recycle product (having a moisture content of 1.5%) coming from a preceding processing, were added.

The product pH during the granulation was 5.2 and the temperature 73° C.

The pH stabilization was carried out in the terminal part of the drum granulator by the addition of 16 kg. of gaseous ammonia.

The product at the granulator outlet had a pH value of 6.0.

The product was successively dried at 95° C. and screened, as specified in Example 1. The analytical results were as follows:

| | |
|---|---|
| Ammoniacal nitrogen | 1.20% |
| Ureic nitrogen | 6.80% |
| Insoluble nitrogen | 6.20% |
| Total nitrogen | 14.20% |
| Water-and-ammonium-citrate-soluble $P_2O_5$ | 6.20% |
| $K_2O$ | 18.20% |
| Total MgO | 2.20% |
| Moisture | 1.50% |
| Activity index | 50 |

The caking, hardness and friability characteristics of the granules were comparable to those of a conventional highquality KPK fertilizer.

EXAMPLE 3

A 20.7.20 fertilizer was produced by operating continuously as follows (the specified amounts refer to a metric ton of final product):

145 kg. of a commercial solution of Formurea 80, 253 kg. of urea at 46% of N, and 140 kg. of $H_2O$ were uniformly mixed and brought to the temperature of 20° C. in an open reactor under stirring, thereby obtaining a solution having a molar ratio urea/formaldehyde of 1.73:1 and a molar ratio water/urea of 1.97:1, and with a pH of 6.0–6.1.

The solution was transferred through an overflow into a second open reactor under stirring, where 10 kg. of an aqueous solution of phosphoric acid at 4% of $P_2O_5$ were added, regulating the addition in order to obtain a pH of 3.0 in the reacting mixture.

In this second reactor, the temperature became stable at 52° C. because of the heat developed by the condensation reaction between urea and formaldehyde, the average residence time of the solution in the reactor being 2 hours.

The so-produced ureaform suspension, equivalent to 522 kg., was directly fed, always continuously and without stopping the working cycle, into a drum granulator, where 210 kg. of an aqueous solution of phosphoric acid at 36% of $P_2O_5$, 99 kg. of ammonium sulphate at 21% of N, 63 kg. of urea, 344 kg. of potassium chloride at 60% of $K_2O$, together with 4000 kg. of recycle (having a moisture content of 1.5%) coming from a preceding processing, were added.

The pH during the granulation was 4.6 and the temperature 80° C.

The pH stabilization took place in the terminal part of the granulator, by the addition of 32 kg. of gaseous ammonia.

The pH value at the granulator outlet was 6.2.

The product was successively dried at 95° C. and screened, as specified in Example 1.

The analytical results were as follows:

| | |
|---|---|
| Ammoniacal nitrogen | 4.80% |
| Ureic nitrogen | 9.20% |
| Insoluble nitrogen | 6.20% |
| Total nitrogen | 20.20% |
| Water-and-ammonium-citrate-soluble $P_2O_5$ | 7.20% |
| $K_2O$ | 20.20% |
| Moisture | 1.5% |
| Activity index | 50 |

The caking, hardness and friability characteristics of the granules were comparable to the ones of a conventional highquality KPK fertilizer.

EXAMPLE 4

A 25.18.0 fertilizer, free from $K_2O$, was produced by operating continuously as follows (the amounts refer to a metric ton of final product):

213 kg. of a solution of Formurea 80, 372 kg. of urea at 46% of N, and 118 kg. of water were uniformly mixed and brought to the temperature of 20° C. in an open reactor under stirring, thereby obtaining a solution having a molar ratio urea/formaldehyde of 1.73:1 and a molar ratio water/urea of 1.27:1, and with a pH of 6.1.

The solution was transferred, through an overflow, into a second open reactor under stirring, where 9.5 kg. of an aqueous solution of $H_3PO_4$ at 1% of $P_2O_5$ were added, regulating the addition in order to obtain a pH of 3.2 in the reacting mixture.

The temperature became stable at 52° C. because of the heat developed by the condensation reaction between urea and formaldehyde; the average residence time of the solution in the reactor was 1 hour and 15 minutes.

The so-produced ureaform suspension, equivalent to 680 kg., was directly fed, always continuously, into a granulator where 266.7 kg. of an aqueous solution of $H_3PO_4$ at 36% of $P_2O_5$, 208 kg. of 18.46.0 diammonium phosphate, 114 kg. of a diluent material (sand), together with 5000 kg. of recycle (having a moisture content of 1.5%), coming from a preceding processing, were added.

The product pH during the granulation was 4.5 and the temperature 70° C.

The product was then ammoniated in the terminal part of the granulator by means of 42 kg. of gaseous ammonia.

The pH value at the granulator outlet was 6.2.

The product coming out of the granulator was dried at the temperature of 95° C. and successively screened; the part between 1 and 4 mm. forms the final product.

The so-produced fertilizer, upon analysis, gave the following results:

| | |
|---|---|
| Ammoniacal nitrogen | 6.60% |
| Ureic nitrogen | 9.50% |
| Insoluble nitrogen | 9.10% |
| Total nitrogen | 25.20% |
| Water-and-ammonium-citrate-soluble $P_2O_5$ | 18.20% |
| Moisture | 1.5% |
| Activity index | 47 |

The caking, hardness and friability characteristics of the granules were comparable to those of a conventional highquality NP fertilizer.

What is claimed is:

1. In a process for the manufacture of a fertilizer containing ureaform and at least one solid fertilizing material different from ureaform and selected from the group consisting of urea, ammonium sulphate, ammonium nitrate, phosphoric acid, ammonium phosphates having different degrees of ammoniation in the solid state or in aqueous suspension, potassium chloride, potassium sulphate, superphosphate, supertriple and mixtures thereof, wherein, in a first step, urea and formaldehyde are brought into contact at 40° to 55° C. in an aqueous medium, according to urea/formaldehyde molar ratios from 1.4 to 1.8, the water/urea ratio being from 1 to 2 and the pH of the reaction mixture being from 2 to 3.5, thus obtaining an aqueous suspension, the improvement consisting essentially in that:

(a) in a second step said aqueous suspension from said first step is admixed at 70° to 80° C., within a granulator, with said solid fertilizing material different from ureaform, and with a solid recycle stream, the pH of the admixture being from 4.5 to 5.5 during the major protion of the granulation time;

(b) at the end of the granulation time the pH is increased to a level between 6 and 6.5; and (c) after the granulation, the thus-obtained fertilizer is dried at 85° to 100° C. and a recycle stream of the dried and solid fertilizer is fed back to said second step (a).

2. A process according to claim 1, wherein the 2 to 3.5 pH range of the first step is obtained by adding phosphoric or sulphuric acid.

3. A process according to claim 1, wherein the 6.0 to 6.5 pH range of (b) is obtained by adding ammonia or calcium hydroxide.

4. A process according to claim 1, wherein said aqueous suspension of said first step is obtained by acidifying down to said 2 to 3.5 pH range a previously manufactured ureaform solution or a mixture of such ureaform solution with urea and water.

* * * * *